United States Patent
McCracken et al.

(10) Patent No.: US 6,711,881 B1
(45) Date of Patent: Mar. 30, 2004

(54) APPARATUS FOR PACKAGING HAY

(76) Inventors: Edgar W. McCracken, Rte. 1, Box 3473, Elgin, OK (US) 73538; Gary D. Griggs, Rte. 1, Box 3473, Elgin, OK (US) 73538; James B. Archer, Rte. 2, Box 85, Seiling, OK (US) 73663

( * ) Notice: Subject to any disclaimer, the term of this patent is extended or adjusted under 35 U.S.C. 154(b) by 0 days.

(21) Appl. No.: 09/576,659

(22) Filed: May 22, 2000

Related U.S. Application Data
(60) Provisional application No. 60/135,337, filed on May 21, 1999.

(51) Int. Cl.$^7$ .............................................. B65B 13/20
(52) U.S. Cl. ............................. 53/529; 53/513; 53/521; 53/570; 83/437.3; 83/857
(58) Field of Search ........................ 53/529, 513, 521, 53/570, 284.7; 83/858, 857, 856, 437.3, 437.2

(56) References Cited

U.S. PATENT DOCUMENTS

| | | | |
|---|---|---|---|
| 3,948,402 A | * 4/1976 | Schott, Jr. .................... | 414/412 |
| 4,300,327 A | 11/1981 | Bridger | |
| 4,408,438 A | * 10/1983 | Rewitzer .................... | 100/438 |
| 4,537,015 A | 8/1985 | Inglett, Jr. et al. | |
| 4,594,836 A | 6/1986 | Good | |
| 4,640,082 A | * 2/1987 | Gill .............................. | 53/523 |
| 4,936,206 A | * 6/1990 | Miles et al. .................... | 100/3 |
| 5,088,271 A | * 2/1992 | Westaway .................... | 53/515 |
| 5,343,670 A | 9/1994 | Gombos et al. | |
| 5,367,932 A | 11/1994 | Bergman | |
| 5,392,591 A | 2/1995 | Simpson | |
| 5,398,487 A | 3/1995 | Inman et al. | |
| 5,509,256 A | * 4/1996 | Groth ........................... | 53/513 |
| 5,570,565 A | * 11/1996 | Simpson ...................... | 53/435 |
| 5,682,734 A | 11/1997 | Laster | |
| 5,692,363 A | 12/1997 | Inman et al. | |
| 5,822,957 A | 10/1998 | Esch | |
| 5,887,504 A | 3/1999 | Gombos et al. | |

* cited by examiner

*Primary Examiner*—Rinaldi I. Rada
*Assistant Examiner*—Thanh Truong
(74) *Attorney, Agent, or Firm*—Crowe & Dunlevy, P.C.

(57) ABSTRACT

The present invention provides an apparatus and method for converting a large bale of hay into a plurality of smaller sized bales having the same nutritional composition and texture as the large bale. The apparatus comprises a first cutting assembly which has a first set of blades which are orthogonally oriented with respect to a second set of blades. The apparatus further comprises a driver head assembly which is used to force a large bale of hay through the first cutting assembly. The apparatus also has a second cutting assembly which comprises a metering knife oriented substantially orthogonal to both the first and second sets of blades of the first cutting assembly. The associated method for processing the large bale fibrous comprises a first step of producing bale sections by pushing the large bale through the first cutting assembly. The method has a second step of producing metered bales through operation of the second cutting assembly. The inventive method further comprises a third step of individually packaging the metered bales.

10 Claims, 6 Drawing Sheets

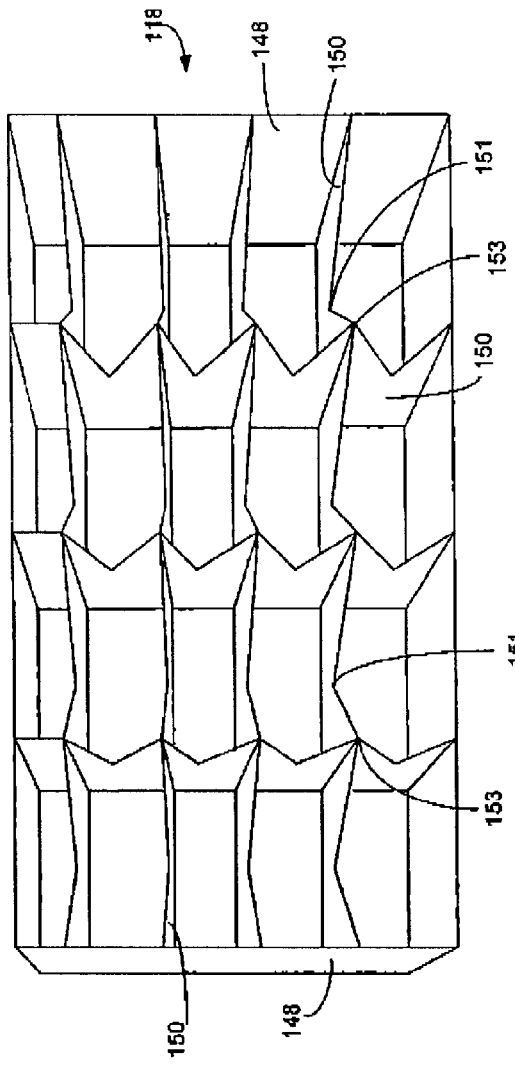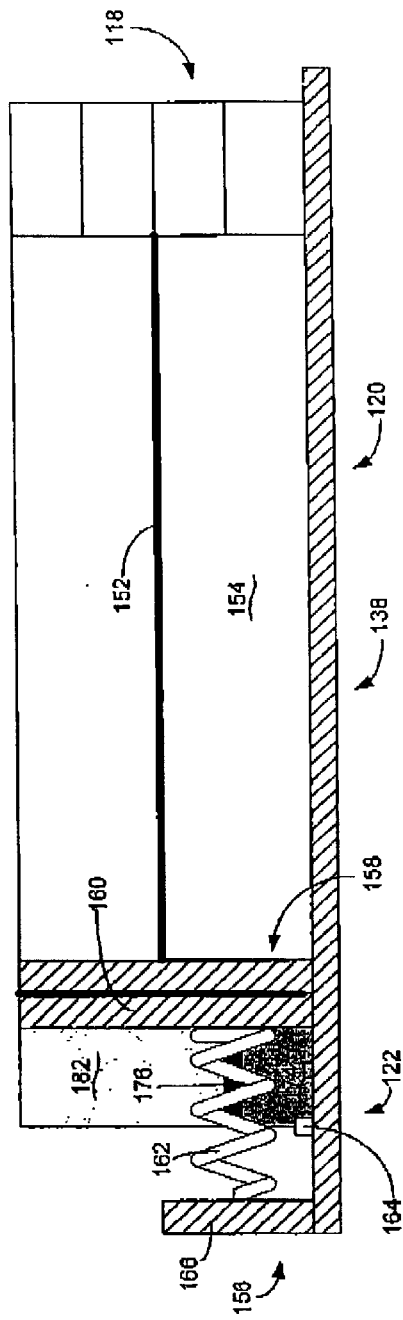

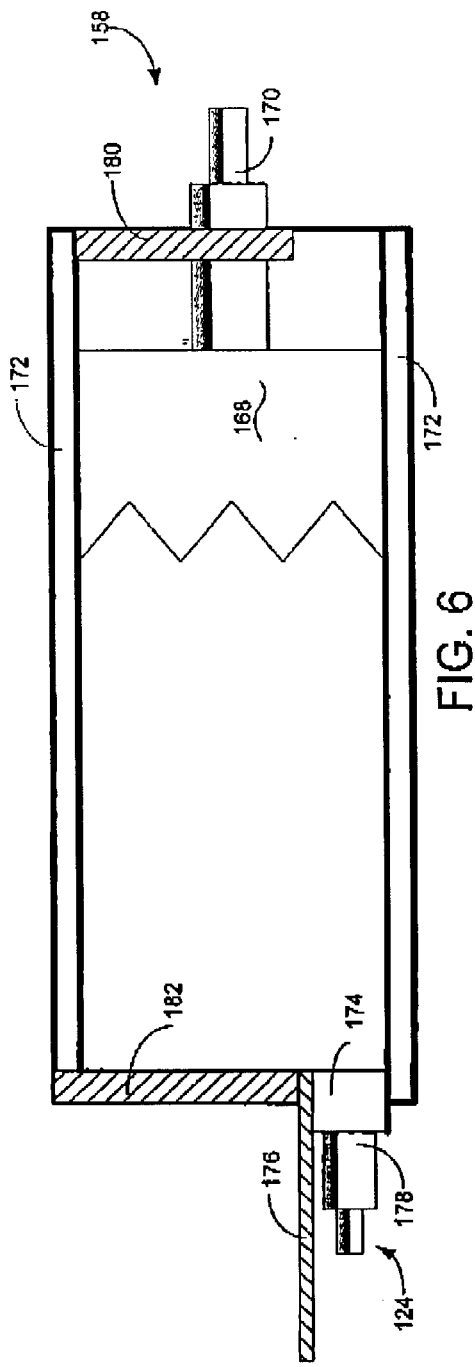
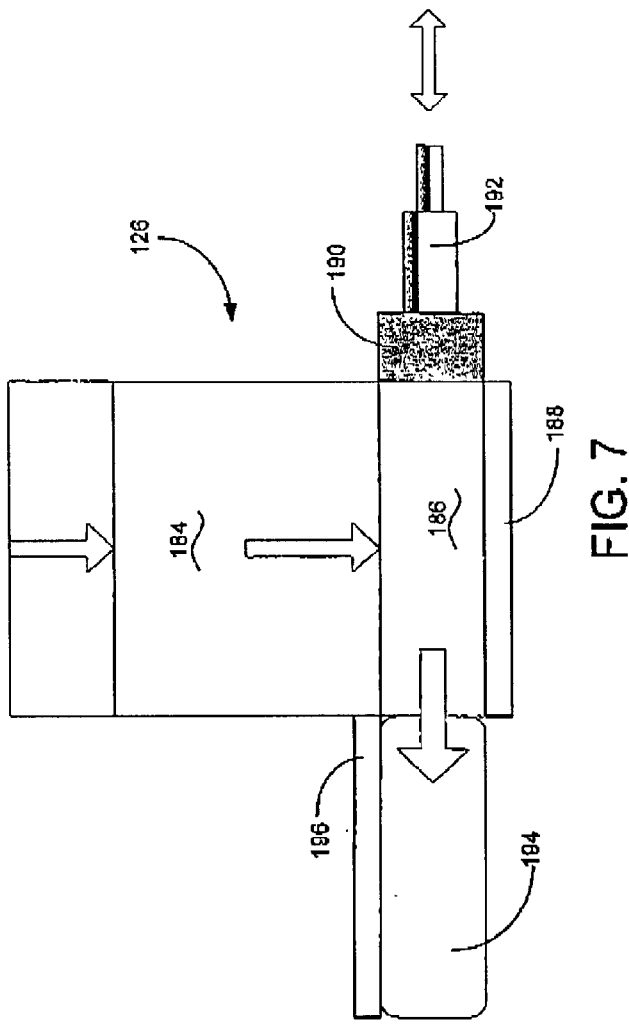

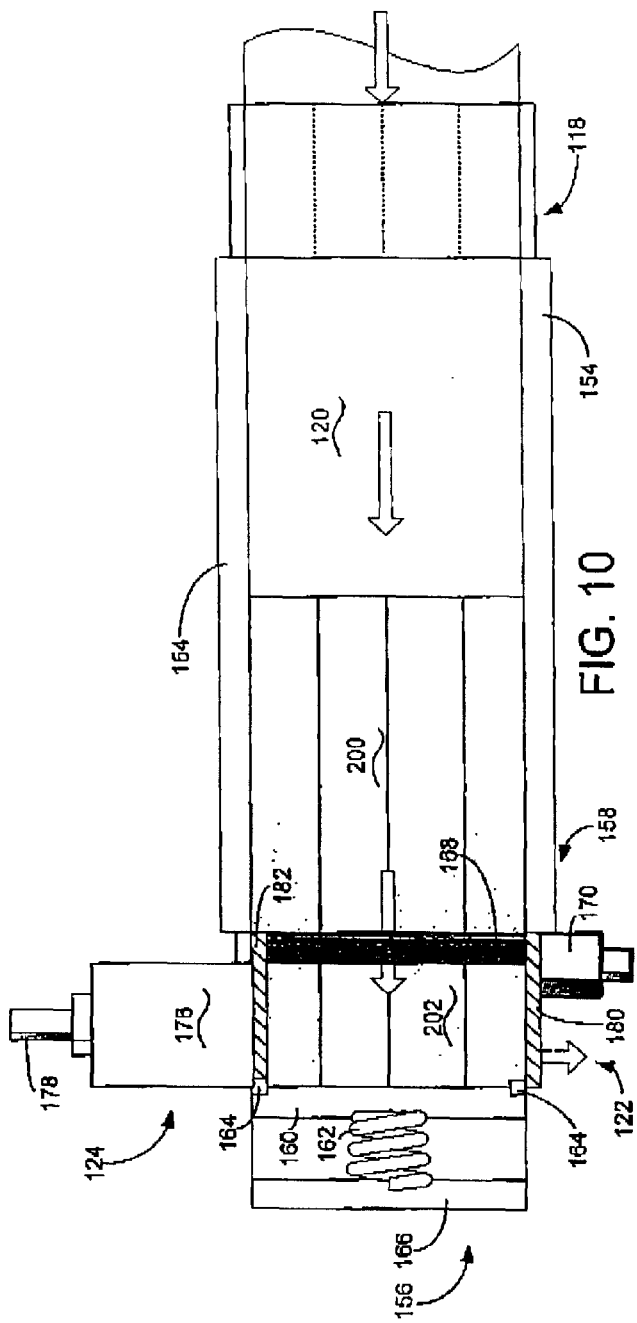
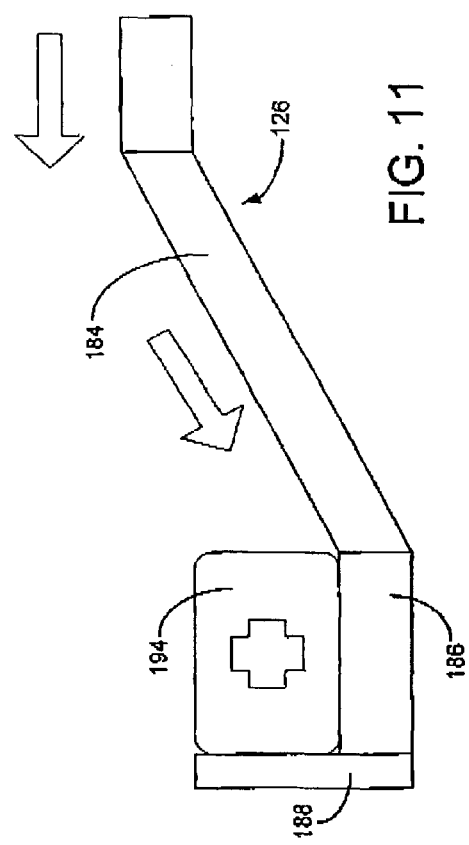

APPARATUS FOR PACKAGING HAY

RELATED APPLICATIONS

This application claims priority to U.S. Provisional Application No. 60/135,337 entitled METHOD FOR PACKAGING HAY, filed May 21, 1999.

FIELD OF THE INVENTION

The present invention relates generally to devices and methods for converting large bales of fibrous material to smaller, more conveniently sized bales. The invention also relates to the packaging of the bales produced.

BACKGROUND OF THE INVENTION

There exists a ready market for the production and sale of hay bales designed to meet the needs of low-volume consumers. For example, the owner of a small number of horses demands an efficient means for purchasing feed for his animals. In such cases, the use of small hay bales is cost-effective and convenient.

Over the years, hay producers have developed a variety of methods for the manufacture of hay bales. Traditionally, the production of small hay bales took place in the field where both harvesting and baling occurred. Upon formation, the individual small bales were collected, through either mechanical or human effort, and transported to a storage location.

With the industrialization of agriculture, hay manufacturers have shifted from small bale production to large bale production. In high volume, large bales of hay are considerably more cost efficient to manufacture, transport and store than traditional smaller bales. Nonetheless, there still exists a market demand for small bales of hay designed for low volume consumption. The Applicants' process involves harvesting large bales of hay that are later processed into smaller, more practical bales.

The dietary use of hay demands that each bale of hay exhibit the requisite nutritional quality. During baling, it is critical to include in each bale the essential nutrients found only in the "heads" or leaves of the plant. Frequently, hay producers grind the hay to facilitate packaging. Grinding the hay tends to remove the heads and leaves and thereby deprives the bale of its nutritional content. Grinding hay also reduces the average length of stem material. Because many animals require the ingestion of stem material of sufficient length for proper digestive function, ground hay may be insufficient as a dietary staple. In light of the foregoing, the nutritional, financial, and practical demands placed upon the manufacture of hay bales creates a pressing need for a cost effective means of producing conveniently sized bales of consistent nutritional quality.

SUMMARY OF THE INVENTION

The present invention provides a cost effective apparatus and method for converting a large bale of hay into a plurality of smaller, more conveniently sized bales having the same nutritional composition and texture as the large bale. In another aspect, the present invention provides an apparatus comprising a first cutting assembly which has a first set of blades which are orthogonally oriented with respect to a second set of blades. The apparatus further comprises a driver head assembly which is used to force a large bale of hay through the first cutting assembly. The apparatus also has a second cutting assembly which comprises a metering knife oriented substantially orthogonal to both the first and second sets of blades of the first cutting assembly.

In another aspect, the present invention provides an associated method for dividing the large bale fibrous material packaging into the smaller bales of consistent size and nutritional quality. The method comprises a first step of producing bale sections by pushing the large bale through the first cutting assembly. The method has a second step of producing metered bales through operation of the second cutting assembly. The inventive method further comprises a third step of individually packaging the metered bales. The packaged bales are resistant to rot, mildew and infestation.

BRIEF DESCRIPTION OF THE DRAWINGS

FIG. 4 is a side elevational view of the driver head assembly, staging area and cutting grate assembly shown in FIG. 1.

FIG. 5 is a top plan view of the driver head assembly, staging area and cutting grate assembly shown in FIG. 1.

FIG. 6 is a front perspective view of the cutting grate assembly shown in FIG. 1.

FIG. 7 is a side elevational view of the cutting grate, compression area, metering knife assembly, metering section and metering limiter assembly shown in FIG. 1.

FIG. 10 is a top plan view of the bagging assembly shown in FIG. 1.

FIG. 11 is a side elevational view of the bagging assembly shown in FIG. 1.

DETAILED DESCRIPTION OF THE PREFERRED EMBODIMENT

Construction of the Apparatus

Figure 1:
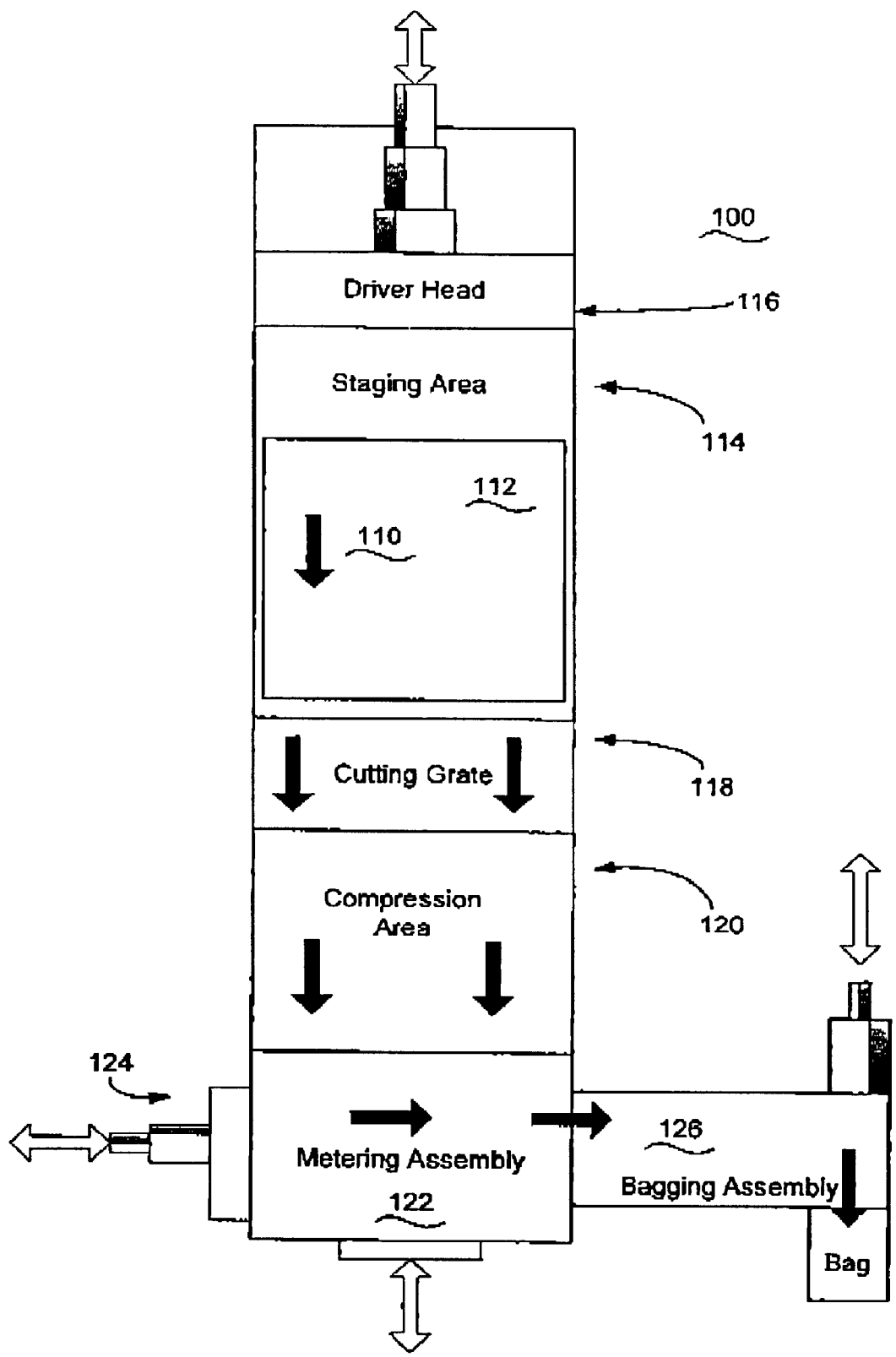
FIG. 1 is an annotated top plan view of an apparatus constructed in accordance with a preferred embodiment of the present invention.

Referring first to FIG. 1, shown therein is a top plan view of an apparatus 100 used for converting a large bales 112 of hay into multiple smaller bales (not shown). FIG. 1 provides an overview of the apparatus 100, directional arrows 110 illustrate the direction of material flow. In the interests of clarity, the function of the apparatus will be discussed with reference to upstream processes and downstream processes. Upstream processes occur toward the beginning of the overall operation cycle with the loading of an unrefined product onto the apparatus. In contrast, a downstream process is defined as a function occurring toward the end of the overall operation cycle, such as packaging. The term "longitudinal" refers to the geometric axis which runs the length of the apparatus 100. The term "lateral" refers to the axis defined by the width of the apparatus.

Continuing with FIG. 1, a large bale 112 is loaded onto and supported by a staging area 114. There are numerous means for loading the large bale 112 onto the staging area 114. Such loading means include, but are not limited to, use of stationary hydraulic lifts, conveyor systems and mobile machinery (i.e. forklifts). Typically, the large bale 112 is four feet wide, four feet tall and eight feet long. A bale of this size composed of conventional fibrous material, like hay, will weigh approximately one ton.

The large bale 112 is pushed across the staging area 114 by a driver head assembly 116 toward a cutting grate assembly 118. The cutting grate assembly 118 longitudinally divides the large bale 112 into a plurality of bale sections (not shown). The bale sections (not shown) exit the cutting grate assembly 118 and are forced into a compression area 120.

The longitudinal division imposed by the cutting grate assembly 118 is maintained as the bales pass through the compression area 120. The bale sections continue moving through the compression area 120 into a metering assembly 122. The metering assembly 122 acts to laterally divide, or "meter," the incoming bales at a selected length. Once metered, a sorting assembly 124 forces the metered bales into a bagging assembly 126 for packaging. The specific components and related operations of each of the aforementioned assemblies and areas will be described in greater detail below.

Figure 2:
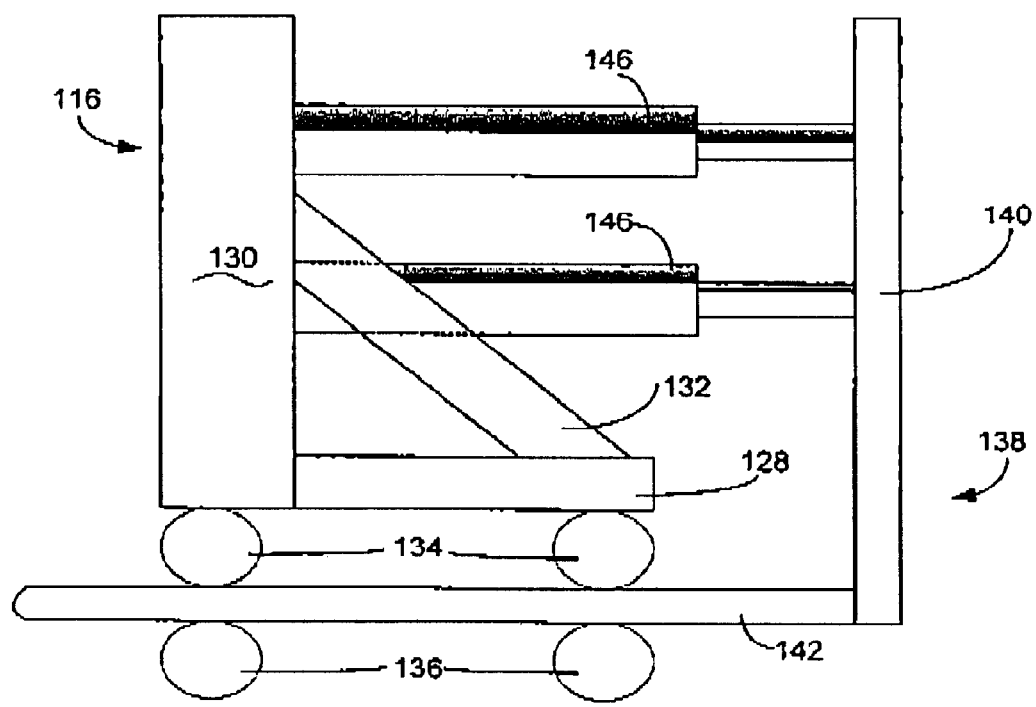
FIG. 2 is a side elevational view of the driver head assembly of the apparatus shown in FIG. 1.
Figure 3:
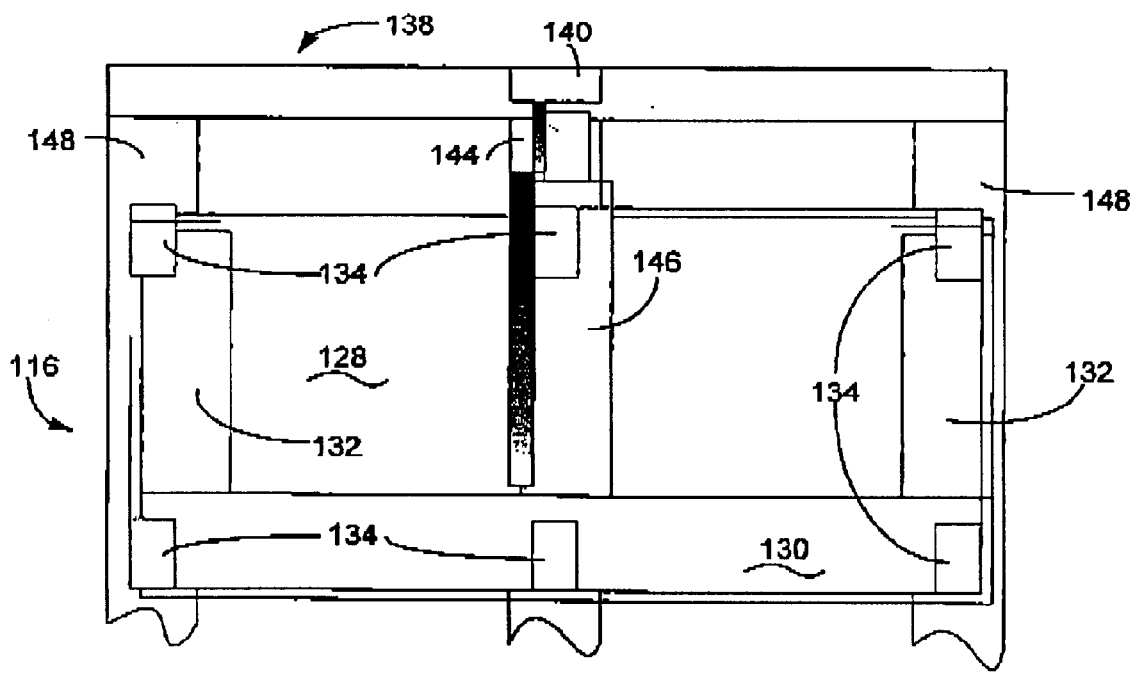
FIG. 3 is a top plan view of the driver head assembly of the apparatus shown in FIG. 1.

Now turning to FIG. 2, shown therein is a side elevational view of the driver head assembly 116. The driver head assembly 116 includes a base plate 128 that supports a front plate 130 and reinforcement beams 132 all of which ride on upper casters 134 and lower casters 136. The driver head assembly 116 also includes, and is supported by, a frame assembly 138. The support frame assembly includes a vertical member 140, outer I-beams 142 and a center I-beam 144 (FIG. 3). One of ordinary skill in the art will recognize that there are a number of configurations for the support frame assembly 138, all of which are within the scope of the present invention. The support frame assembly 138 should be of sufficient structural strength and rigidity to provide adequate support to all stationary and mobile components of the apparatus 100. Such support frame assemblies may include, but are not limited to, steel structures and combinations of steel and cement structural elements.

Preferably, the six upper casters 134 are oriented such that there are two casters on each side of the driver head assembly 116 and two casters in the center of the driver head assembly 116. The four lower casters 136 are fixed below the flanges on two outer I-beams 142 on opposite sides of the driver head assembly 116.

The driver head assembly 116 also includes hydraulic cylinders 146 which are rigidly supported at their terminal ends by the vertical member 140. In a preferred embodiment of the present invention, the hydraulic cylinders 146 are telescopic with five stages and are mounted horizontally. Preferably, the largest stage of the hydraulic cylinders 146 is 7 inches in diameter. The hydraulic cylinders 146 should be of sufficient size and quality to impart between 100,000 and 200,000 pounds of force.

As hydraulic pressure is increased, the hydraulic cylinders 146 telescopically expand and thereby move the driver head assembly 116 along the outer I-beams 142 and center I-beam 144 on upper casters 134 and lower casters 136. In the preferred embodiment of the present invention, the driver head assembly 116 and large bale 112 travel upon a floor (not shown). Preferably, the floor is constructed of channel iron, is substantially smooth and is supported by the center I-beam 144.

In an alternate embodiment, the rolling means of the driver head assembly 116 are disposed below the floor of the apparatus 100. Enclosing the castors below the apparatus floor reduces the presence of fibrous debris within the castors and benefits operator safety. The benefits proposed by the alternate embodiment of the driver head assembly 116 must be balanced against the additional cost of manufacture.

Turning now to FIG. 3, shown therein is a top plan view of the driver head assembly 116 constructed in accordance with a preferred embodiment of the present invention. FIG. 3 shows that the hydraulic cylinders 146 are vertically aligned with one another and with the center I-beam 144. It will be understood that additional configurations of the hydraulic cylinders 146 exist and are contemplated as within the scope of this invention. Such additional configurations include aligning the hydraulic cylinders 146 in horizontal and diagonal planes.

Now referring to FIG. 4, shown therein is a front perspective view of the cutting grate assembly 118. The cutting grate assembly 118 is comprised of a grate frame 148 that contains a plurality of blades 150. Preferably, the blades 150 are constructed from ⅜" metal and are manufactured such that each blade 150 has two leading edges tapered to a single point, designated by reference numeral 151. The blades 150 are configured such that they intersect one another at right angles and extend across the height and width of the grate frame 148. In this way, the intersection of the leading edges of the blades 150 form insertion points 153. Also preferred are blades 150 that self-sharpen through ordinary operation of the apparatus 100.

In a preferred embodiment, the cutting grate assembly 118 is designed for facilitated exchange with alternate cutting grate assemblies. Replacing the cutting grate assembly 118 allows the operator to select the size and shape of the smaller bales produced by the apparatus 100. Alternate configurations of the cutting grate assembly 118 may depend on specific applications of the apparatus 100 and are contemplated as within the scope of the present invention.

In a preferred embodiment, the configuration of the blades 150 divides a large bale into sixteen smaller bale sections of uniform size and composition. Depending on the height of the large bale 112, a portion of hay is passed between the top row of blades 150 and the bottom of the grate frame assembly 148. Hay passed above the top row of blades 150 is not used in bale formation and is discarded during downstream processes. For example, a large bale measuring 4.5 ft. high by 4 ft. wide by 8 ft long is divided into sixteen bale sections measuring 1 ft. by 1 ft. by 8 ft. The hay in the large bale 112 which is higher than 4 feet tall is excluded from bale formation to ensure the uniformity of bale section size.

Turning now to FIG. 5, shown therein is a side elevational view of the cutting grate assembly 118, the compression area 120, and the metering assembly 122. A separator 152 runs the length of the compression area 120 and is used to maintain the division of the bale sections (not shown) imposed by the cutting grate assembly 118. The separator 152 comprises a substantially rigid plate extending between the cutting grate assembly 118 and the metering assembly 122. The separator 152 is supported laterally by sidewalls 154. In addition to supporting the separator 152, sidewalls 154 provide stability and compression to the bale sections as they pass through the compression area 120.

The metering assembly 122 comprises a metering limiter subassembly 156 and a metering knife subassembly 158. The metering limiter subassembly 156 further comprises a limiter head 160, a limiter spring 162, a limiter latch 164 and a limiter support 166. The limiter head 160 consists of a vertical plate mounted for movement along a plurality of tracks (not shown) which extend from the limiter support 166 to the metering knife subassembly 158. In a preferred embodiment, the limiter spring 162 comprises a coil spring with a range of linear motion greater than two feet. Although the present embodiment suggests the use of a spring mechanism, alternate devices, like hydraulic or pneumatic presses are considered as within the scope of the invention.

The limiter latch 164 consists essentially of a latch mechanism controlled by the operation of the metering knife subassembly 158 and is designed to lock the limiter head 160 in a compressed position. The limiter support 166 comprises a vertical steel member which is rigidly attached to the support frame 138.

When not engaged by upstream hay, the limiter head 160 is forced to a position adjacent the metering knife subassembly 158 by the limiter spring 162. From a discussion of the operation of the metering assembly 122, it will be understood that the stroke of the metering limiter subassembly 156 determines the length of the "metered" bales (not shown). In a preferred embodiment of the present invention, the metering limiter subassembly 156 has a stroke of two feet which corresponds to the optimal length for the metered bale.

Turning now to FIG. 6, the metering knife subassembly 158 comprises a metering knife 168, a knife press 170 and stationary tracks 172. Metering knife 168 is preferably constructed of ⅜" steel, is provided a height equivalent to the cutting grate assembly 118 and is manufactured to have a plurality of jagged leading edges. During operation, the motion of the metering knife 168 is limited to movement in a single geometric plane by the stationary tracks 172.

Continuing with FIG. 6, shown therein is a view of the sorting assembly 124. The sorting assembly 124 comprises a push-off head 174, a drop table 176 and a hydraulic cylinder 178. The push-off head 174 consists essentially of a rigid plate manufactured to be nominally smaller than the profile defined by the length and height of the metered bales (not shown). The push-off head 174 is rigidly attached to, and moves with, the hydraulic cylinder 178. The drop table 176 is rigidly affixed to the push-off head 174 and comprises a substantially flat piece of metal having a perimeter equivalent to the perimeter defined by the top surface of four adjacent metered bales.

The sorting assembly 124 also includes a first retaining wall 180 manufactured to prevent lateral movement of the top three rows of metered bales while permitting the sorting of the bottom row of bales. The first retaining wall 180 comprises a rectangular steel plate having a height equivalent to three stacked metered bales and a width of at least one-half of the selected meter length. The first retaining wall 180 is attached immediately downstream of the metering knife subassembly 158 and opposite the hydraulic cylinder 178. The first retaining wall 180 is attached such that, in a stack of four metered bales, only the bottom bale passes beneath the first retaining wall 180.

The sorting assembly 124 further includes a second retaining wall 182 manufactured to substantially the same specifications as the first retaining wall 180. Like the first retaining wall 180, the second retaining wall 182 is also used to contain metered bales during the sorting operation. The second retaining wall 182 is attached downstream from the metering knife subassembly and opposite the first retaining wall 180. The second retaining wall 182 should be attached such that the push-off head 174 and drop table 176 pass freely under the second retaining wall 182 during the retraction phase of their operation.

Turning now to FIG. 7, shown therein is a top plan view the bagging assembly 126. The bagging assembly 126 includes a ramp 184, a deck 186 and a stopper 188. The ramp 184 is manufactured to have a width nominally larger than the length of the metered bales and a length sufficient to support three metered bales side-by-side. The deck 186 is manufactured to have the same length and width as a metered bale. The stopper 188 is rigidly attached to the deck 186 and consists essentially of a plate or beam extending the length of a metered bale.

The bagging assembly 126 also includes a ram 190, a piston 192, a bag 194 and a heat sealing device 196. The ram 190 is preferably a metal plate of sufficient rigidity to controllably force a metered bale from the deck 186 into the bag 194. The ram 190 is rigidly affixed to, and driven by, the piston 192. Preferably, the piston 192 is hydraulic or pneumatic and is designed for extended periods of rapid actuation. In a preferred embodiment, the bag 194 is selected to be composed of a plastic with a relatively low melting point. The bag 194 should have a single opening and be reasonably flexible and water-resistant. The bag 194 may bear labels or insignia useful for a desired commercial purpose.

The heat sealing device 196 is preferably a metal bar heated through electric resistance to a temperature sufficient temperature to meld shut the open end of the bag 194. Preferably, the heat sealing device 196 has an operator handle constructed from a thermally non-conductive material, such as rubber. One of ordinary skill in the art will recognize that alternative packaging devices and methods exist and are considered within the scope of the present invention. Such additional devices and methods include the use of baling wire, twine or rope and alternate forms of heat sealed shrink wrap.

Use of the Apparatus

Figure 8:
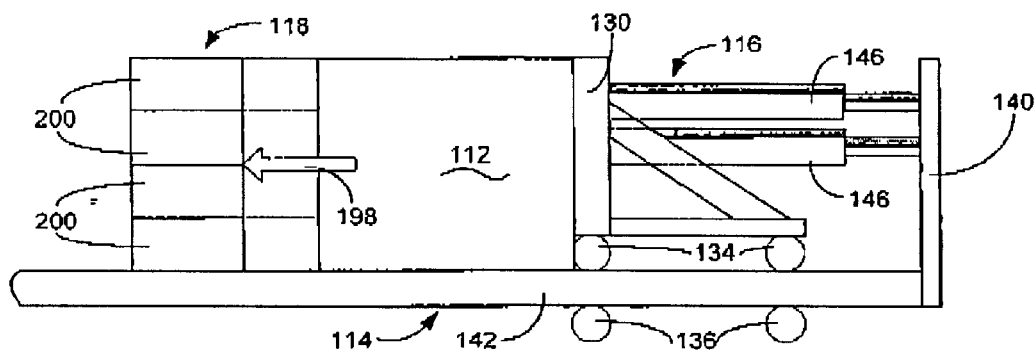
FIG. 8 is a top plan view of the cutting grate, compression area, metering knife assembly, metering section and metering limiter assembly shown in FIG. 1.
Figure 9:
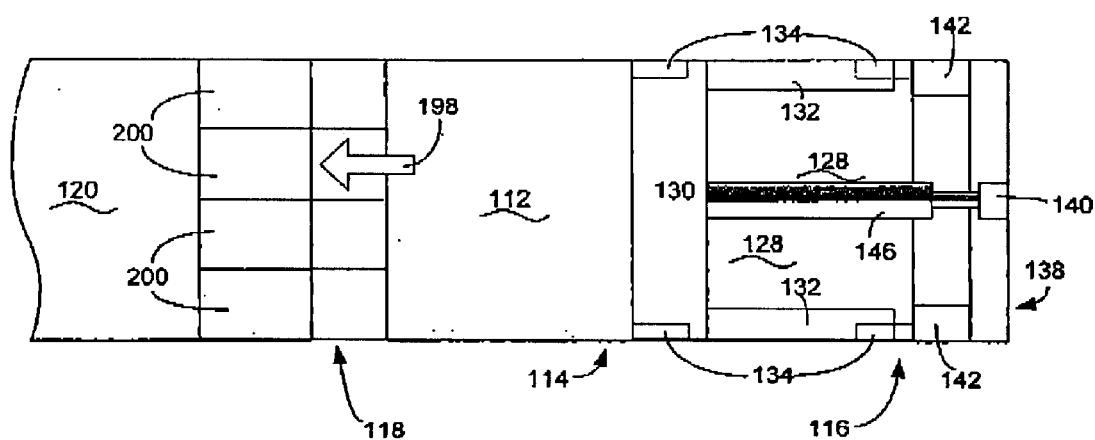
FIG. 9 is a front elevational view of the metering knife assembly and metering section shown in FIG. 1.

The following text details the preferred operation of the apparatus 100. Turning first to FIGS. 8 and 9, shown therein are respective side elevational and top plan views of the cooperative function of the driver head assembly 116, the staging area 114 and the cutting grate assembly 118. FIG. 8 shows the driver head assembly 116 in an extended position nearing full stroke as the large bale 112 is pushed through the cutting grate assembly 118 as indicated by directional arrow 198. The cooperative function of the cutting grate assembly 118 and driver head assembly 116 produces a plurality of bale sections 200. The bale sections 200 are forced from the cutting grate assembly 118 into the compression area 120. Excess hay not used in the formation of bale sections 200 is removed from the apparatus during the subsequent metering operation.

At full extension, the driver head assembly 116 will be located adjacent to the upstream side of the cutting grate assembly 118. The substantially flat upstream side of the driver head assembly 116 is unable to clear the cutting grate assembly 118 of hay contained therein. As such, at the end of full stroke, the driver head assembly 116 is retracted to permit the loading of a second large bale (not shown). The driver head assembly 116 is then extended, forcing the second large bale into the cutting grate assembly 118. The introduction of the second large bale into the cutting grate assembly 118 forces the balance of the first large bale 112 from the cutting grate assembly 118. It will be understood to one of ordinary skill in the art that each successive bale of hay serves as a plunger for providing downstream movement to previously loaded bales.

Turning now to FIG. 10, shown therein is a top view of the cooperative operation of the cutting grate assembly 118, the compression area 120, the metering assembly 122 and the sorting assembly 124. While passing through the compression area 120, the bale sections 200 are horizontally parted by the separator 152 (FIG. 5). As mentioned above, the sidewalls 154 provide lateral support to the bale sections as they are forced through the compression area 120.

The bale sections 200 cross the compression area 120 and into the metering knife subassembly 158 where the bales abut the limiter head 160. As shown in FIG. 5, before contacting the incoming bales, the limiter spring 162 forces the limiter head 160 to a position adjacent the metering knife subassembly 158. After contacting the incoming bales, the limiter head 160 is pushed back against the force of the limiter spring 162 to the compressed position shown in FIG. 10.

Once the limiter head 160 is pushed back full stroke and the limiter spring 162 compressed, the forward movement of the incoming bale sections 200 is stopped. Compression in the metering assembly 122 is maintained through the continued application of upstream pressure by the driver head assembly 116 and by the force applied by the limiter spring 162. The elevated compression facilitates and improves the quality of the subsequent metering of the bale sections 200.

The metering operation is initiated by increasing the hydraulic pressure within the knife cylinder 170. As the knife cylinder 170 expands, the metering knife 168 is forced through the bale sections 200 and thereby creates a plurality of metered bales 202. At the end of the metering cut, there are sixteen metered bales 202 of desired height, length and width present in the metering assembly 122 between the extended metering knife 168 and the limiter head 160. The metered bales 202 are stacked four wide by four high and each bale is preferably 1 ft. high by 1 ft. wide by 2 ft. long.

At the close of a metering operation, the function of the sorting assembly 124 begins with the activation of the hydraulic cylinder 178. Simultaneous with the initiation of the sorting operation, limiter latches 164 engage the limiter head 160. The limiter latches 164 lock the limiter head 160 in the compressed position and reduce the application of pressure by the limiter head 160 during the sorting operation.

As the hydraulic cylinder 178 expands, the push-off head 174 and drop table 176 are moved into contact with the bottom row of metered bales 202. The push-off head 174 forces the bottom row of metered bales 202 through the metering assembly 122 and into the bagging assembly 126.

During the operation of the sorting assembly 124, the frictional resistance between the stacked metered bales 202 causes all sixteen bales to move as a single unit. As such, the first retaining wall 180 is needed to restrict the top three rows of metered bales 202 from prematurely entering the bagging assembly 126. The first retaining wall prevents lateral movement of the top three rows of metered bales 202 while permitting the bottom row of bales to pass under the retaining wall.

As the push-off head forces the bottom row of metered bales 202 into the bagging assembly 126, the drop table 176 moves under the top three rows of end metered bales 202. The drop table 176 completely supports the top three rows of metered bales 202 at full extension of the sorting assembly 126. After reaching full extension, the push-off head 174 and drop table 176 are retracted to their initial positions. As the drop table 176 retracts, the top three rows of metered bales 202 are contained within the metering assembly 122 by the second retaining wall 182. As the drop table 176 passes under the second retaining wall 182, the drop table 176 is pulled out from under the top three rows of metered bales 202 causing them to sequentially fall onto the metering assembly 122 floor.

Upon full retraction of the drop table 176, all metered bales 202 remaining in the metering assembly 122 are stacked and aligned between the metering knife 168 and limiter head 160. The push-off head 174 repeats the push-off cycle an additional three times, once for each row of metered bales 202 remaining in the metering assembly 122. Once all metered bales 202 have been transferred to the bagging assembly 126 and the sorting assembly 124 is fully retracted, the limiter latches 164 are released and the limiter head 160 resets by returning to its initial position adjacent the metering knife subassembly assembly 158. The metering knife subassembly 158 is then reset by retracting the metering knife 168 to its initial position.

After each of the aforementioned assemblies has been reset, the driver head assembly 116 pushes a subsequent length of the bale sections 200 into the metering assembly 122. It will be understood that, with a large bale of eight feet in length and desired metered bales of two feet in length, the metering operation will be performed four times per single large bale. Accordingly, the sorting assembly 124 must complete sixteen operation cycles per single large bale.

Turning now to FIG. 11, after metering, the push-off head 174 forces a row of metered bales 202 onto the ramp 184. Gravity forces the metered bales 202 down the ramp 184 toward the deck 186. The lead metered bale 202 comes to rest in abutment with the stopper 188. The trailing metered bales 202 are stopped against the lead metered bale 202 and remain on the ramp 184. The ram 190 (shown in FIG. 7) then pushes the lead metered bale 202 from the deck portion 186 into a bag 194. Once the metered bale 202 is placed within the bag 194, a heat sealing mechanism 196 closes the bag. The packaged product is then removed from the apparatus 100.

After placing the leading metered bale 202 into the bag 196, the ram 190 retracts into is initial position. The retraction of the ram 190 permits a subsequent metered bale 202 to slide from its position on the ramp 184 to the deck 186. The operation of the ram 190 is repeated three additional times for each row of metered bales 202 leaving the metering assembly 122. Accordingly, the operation cycles of the bagging assembly 126 are repeated sixty-four times per division of single large bale 112.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for dividing bales of fibrous material, the apparatus comprising:

a staging area for receiving and supporting large bales of material, wherein the staging area comprises a floor having a substantially smooth surface;

a cutting grate assembly for longitudinally dividing the large bales into a plurality of bale sections, wherein the cutting grate assembly comprises a first plurality of blades oriented substantially perpendicular to a second plurality of blades;

a metering assembly for severing the bale sections into metered bales, the metering assembly comprising a metering knife and a metering limiter;

a driver head assembly for moving the large bales from the staging area through the cutting grate assembly and into the metering area;

a sorting assembly for selectively moving the metered bales from the metering assembly, wherein the sorting assembly includes a push-off head and a drop table that move together during the operation of the sorting assembly; and a bagging assembly for packaging the metered bales.

2. The apparatus of claim 1, wherein the apparatus further comprises a compression area for receiving and supporting the bale sections, wherein the compression area has a plurality of substantially parallel support members for maintaining the bale divisions imposed by the cutting grate assembly.

3. The apparatus of claim 1, wherein the bale sections produced by the cutting grate assembly are of substantially uniform size and composition.

4. The apparatus of claim 1, wherein each blade of the cutting grate assembly has two leading edges which taper to a single point.

5. The apparatus of claim 1, wherein the sorting assembly sequentially moves the metered bales from the metering assembly.

6. The apparatus of claim 1, wherein the bagging assembly has an inclined delivery ramp and a ram for placing each metered bale into a unique bag.

7. An apparatus for dividing baled fibrous material, the apparatus comprising:

a driver head assembly configured to impart a force that moves the fibrous material through the apparatus;

a cutting grate assembly having a first plurality of blades oriented substantially perpendicular to a second plurality of blades, wherein each blade has two leading edges that taper to a single point;

a metering assembly having a metering knife and a metering limiter, wherein the metering limiter imparts a force on the fibrous material in opposition to the force produced by the driver head; and a sorting assembly having a push-off head, a drop table, a first retaining wall and a second retaining wall, wherein the drop table is configured to move with the push-off head during the operation of the sorting assembly.

8. The apparatus of claim 7, wherein the metering assembly is configured to have a stroke of about two feet.

9. The apparatus of claim 7, further comprising a limiter head and a limiter latch, wherein the limiter latch captures the limiter head, thereby isolating the force imparted by the limiter head from the fibrous material.

10. The apparatus of claim 7, wherein the leading edges of four connected blades forms an initial contact point.

* * * * *